(12) United States Patent
Shimura et al.

(10) Patent No.: US 12,097,470 B2
(45) Date of Patent: Sep. 24, 2024

(54) POROUS MEMBRANE, COMPOSITE MEMBRANE, AND METHOD FOR PRODUCING POROUS MEMBRANE

(71) Applicant: Toray Industries, Inc., Tokyo (JP)

(72) Inventors: Shun Shimura, Otsu (JP); Masayuki Hanakawa, Otsu (JP); Kenta Iwai, Otsu (JP); Takaaki Yasuda, Otsu (JP)

(73) Assignee: Toray Industries, Inc., Tokyo (JP)

( * ) Notice: Subject to any disclaimer, the term of this patent is extended or adjusted under 35 U.S.C. 154(b) by 666 days.

(21) Appl. No.: 17/413,734

(22) PCT Filed: Dec. 24, 2019

(86) PCT No.: PCT/JP2019/050576
§ 371 (c)(1),
(2) Date: Jun. 14, 2021

(87) PCT Pub. No.: WO2020/138065
PCT Pub. Date: Jul. 2, 2020

(65) Prior Publication Data
US 2022/0056235 A1     Feb. 24, 2022

(30) Foreign Application Priority Data
Dec. 26, 2018   (JP) ................... 2018-242771

(51) Int. Cl.
| | |
|---|---|
| *B01D 67/00* | (2006.01) |
| *B01D 69/02* | (2006.01) |
| *B01D 69/10* | (2006.01) |
| *B01D 69/12* | (2006.01) |
| *B01D 71/34* | (2006.01) |
| *C08J 9/00* | (2006.01) |
| *C08J 9/28* | (2006.01) |
| *C08L 27/16* | (2006.01) |

(52) U.S. Cl.
CPC ...... *B01D 67/0011* (2013.01); *B01D 67/0016* (2013.01); *B01D 69/02* (2013.01); *B01D 69/1071* (2022.08); *B01D 69/108* (2022.08); *B01D 69/12* (2013.01); *B01D 71/34* (2013.01); *C08J 9/0061* (2013.01); *C08J 9/28* (2013.01); *C08L 27/16* (2013.01); *B01D 2325/02832* (2022.08); *B01D 2325/02833* (2022.08); *B01D 2325/20* (2013.01); *B01D 2325/34* (2013.01); *B01D 2325/36* (2013.01); *C08J 2201/0544* (2013.01); *C08J 2327/16* (2013.01)

(58) Field of Classification Search
CPC ............ B01D 67/0011; B01D 67/0016; B01D 69/02; B01D 69/12; B01D 69/108; B01D 69/1071; B01D 71/34; B01D 2325/20; B01D 2325/34; B01D 2325/36; B01D 2325/02833; B01D 2325/02832; C08J 9/0061; C08J 9/28; C08J 2201/0544; C08J 2327/16; C08L 27/16

USPC ........................................................ 521/70
See application file for complete search history.

(56) References Cited

U.S. PATENT DOCUMENTS

| | | | |
|---|---|---|---|
| 2003/0094409 A1 | 5/2003 | Minegishi et al. | |
| 2005/0258101 A1 | 11/2005 | Minegishi et al. | |
| 2007/0090051 A1 | 4/2007 | Minegishi et al. | |
| 2009/0101600 A1 | 4/2009 | Shiki et al. | |
| 2010/0000937 A1 | 1/2010 | Hanakawa et al. | |
| 2011/0017661 A1 | 1/2011 | Kosar | |
| 2011/0207841 A1* | 8/2011 | Kosar | B01D 71/403 |
| | | | 521/134 |
| 2011/0226689 A1* | 9/2011 | Komori | B01D 67/0009 |
| | | | 427/244 |
| 2014/0373915 A1 | 12/2014 | Saito et al. | |
| 2016/0008772 A1* | 1/2016 | Kosar | B01D 69/06 |
| | | | 521/88 |
| 2016/0038884 A1 | 2/2016 | Hikita et al. | |
| 2018/0030293 A1 | 2/2018 | Gotou et al. | |

FOREIGN PATENT DOCUMENTS

| | | |
|---|---|---|
| CN | 1481272 A | 3/2004 |
| CN | 101500695 A | 8/2009 |
| CN | 102196849 A | 9/2011 |

(Continued)

OTHER PUBLICATIONS

International Search Report and Written Opinion for International Application No. PCT/JP2019/050576, dated Mar. 24, 2020, 7 pages.
Mertens et al., "Crosslinked PVDF-Membranes for Solvent Resistant Nanofiltration", Journal of Membrane Science, Nov. 1, 2018, vol. 566, pp. 223-230, XP055972113.
Extended European Search Report for European Application No. 19 903 765.6, dated Oct. 26, 2022, 7 pages.
Chinese Office Action for Chinese Application No. 201980086204.2, dated Jul. 27, 2022 with translation, 21 pages.

(Continued)

*Primary Examiner* — Michael M. Bernshteyn
(74) *Attorney, Agent, or Firm* — Buchanan Ingersoll & Rooney PC

(57) ABSTRACT

The present invention relates to a porous membrane including a polymer including a polyvinylidene fluoride-based resin as a main component, and a branched polyvinylidene fluoride-based resin as the polyvinylidene fluoride-based resin, in which the polymer has a value of a of 0.32 to 0.41 and a value of b of 0.18 to 0.42, each of which is determined by approximation according to the formula 1 below from a radius of gyration $<S^2>^{1/2}$ and an absolute molecular weight $M_w$ of the polymer which are measured by GPC-MALS (gel permeation chromatograph equipped with a multi-angle light scattering detector). $<S^2>^{1/2}=bM_w{}^a$ (Formula 1).

7 Claims, 5 Drawing Sheets

(56) References Cited

FOREIGN PATENT DOCUMENTS

| | | | |
|---|---|---|---|
| CN | 104066577 | A | 9/2014 |
| CN | 105008029 | A | 10/2015 |
| CN | 107210376 | A | 9/2017 |
| CN | 107636498 | A | 1/2018 |
| JP | 10316793 | A | 12/1998 |
| JP | 2006263721 | A | 10/2006 |
| JP | 2009256455 | A | 11/2009 |
| JP | 2010526885 | A | 8/2010 |
| JP | 2013202461 | A | 10/2013 |
| JP | 2014076446 | A | 5/2014 |
| JP | 2016510688 | A | 4/2016 |
| KR | 20100078570 | A | 7/2010 |
| WO | 2006135966 | A1 | 12/2006 |
| WO | 2010032808 | A1 | 3/2010 |
| WO | 2014137721 | A1 | 9/2014 |
| WO | 2014142311 | A1 | 9/2014 |
| WO | 2015133364 | A1 | 9/2015 |

OTHER PUBLICATIONS

Mori, S., "Size Exclusion Chromatography," 1992, Kyoritsu Shuppan Co., Ltd., ISBN4-320-04274-3, 9 pages, (partial English translation).

\* cited by examiner

POROUS MEMBRANE, COMPOSITE MEMBRANE, AND METHOD FOR PRODUCING POROUS MEMBRANE

CROSS REFERENCE TO RELATED APPLICATIONS

This is the U.S. National Phase application of PCT/JP2019/050576, filed Dec. 24, 2019, which claims priority to Japanese Patent Application No. 2018-242771, filed Dec. 26, 2018, the disclosures of these applications being incorporated herein by reference in their entireties for all purposes.

FIELD OF THE INVENTION

The present invention relates to a porous membrane, a composite membrane, and a method of producing a porous membrane.

BACKGROUND OF THE INVENTION

In recent years, porous membranes such as microfiltration membranes or ultrafiltration membranes have been used in various fields such as water treatment fields such as water purification or wastewater treatment, medical fields such as blood purification, or food industry fields. Since porous membranes in such fields are repeatedly used and thus are washed or sterilized with various chemicals, high chemical resistance is usually required.

As a porous membrane exhibiting excellent chemical resistance, a porous membrane containing a polymer containing a polyvinylidene fluoride-based resin is known. For example, Patent Literature 1 discloses a technique of reducing a pore size distribution in a cross-sectional structure of a porous membrane containing a polymer containing a polyvinylidene fluoride-based resin to improve separation performance. Patent Literature 2 discloses a technique of increasing a pore size of a porous membrane to improve permeation performance by selecting a long chain branched fluoropolymer as a polyvinylidene fluoride-based resin contained in a porous membrane.

PATENT LITERATURE

Patent Literature 1: JP-A-2006-263721
Patent Literature 2: JP-A-2016-510688

SUMMARY OF THE INVENTION

However, in a conventional porous membrane including a polymer including a polyvinylidene fluoride-based resin and having an improved separation performance or permeation performance, there is a problem that both performances in a trade-off relationship cannot coexist with each other and one of them will be sacrificed.

Accordingly, an object of the present invention is to provide a porous membrane capable of achieving both excellent separation performance and permeation performance and having high chemical resistance.

In order to solve the above problems, the present invention provides a porous membrane including a polymer including a polyvinylidene fluoride-based resin as a main component, and a branched polyvinylidene fluoride-based resin as the polyvinylidene fluoride-based resin, in which the polymer has a value of a of 0.32 to 0.41 and a value of b of 0.18 to 0.42, each of which is determined by approximation according to the formula 1 below from a radius of gyration $<S^2>^{1/2}$ and an absolute molecular weight $M_w$ of the polymer which are measured by GPC-MALS (gel permeation chromatograph equipped with a multi-angle light scattering detector).

$$<S_2>^{1/2} bM_w{}^a \qquad \text{(Formula 1)}$$

According to the present invention, it is possible to provide a porous membrane which achieves both excellent separation performance and permeation performance while ensuring high chemical resistance owing to including a polymer including a polyvinylidene fluoride-based resin as a main component.

DETAILED DESCRIPTION OF EMBODIMENTS OF THE INVENTION

Figure 1:
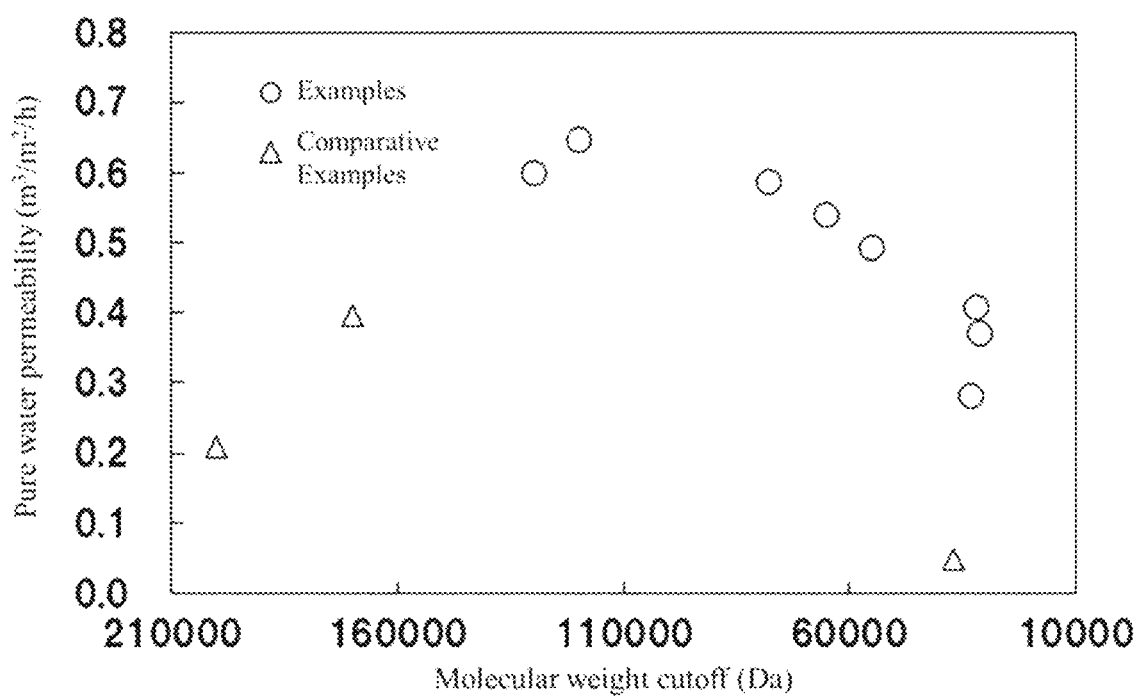
FIG. 1 is a graph showing evaluation results of porous membranes in Examples and Comparative Examples.

Hereinafter, embodiments of the present invention will be described in detail with reference to the drawings, but the present invention is not limited to these embodiments. In the present description, "mass" has the same meaning as "weight".

It is necessary for the porous membrane according to the embodiment of the present invention to include a polymer including a polyvinylidene fluoride-based resin as a main component, and a branched polyvinylidene fluoride-based resin as the polyvinylidene fluoride-based resin, in which the polymer has a value of a of 0.32 to 0.41 and a value of b of 0.18 to 0.42, each of which is determined by approximation according to the formula 1 below from a radius of gyration $<S^2>^{1/2}$ and an absolute molecular weight $M_w$ of the polymer which are measured by GPC-MALS (gel permeation chromatograph equipped with a multi-angle light scattering detector).

$$<S^2>^{1/2} = bM_w{}^a \qquad \text{(Formula 1),}$$

When the value of a for the polymer determined from the relationship of the above formula 1 is 0.41 or less, the radius of gyration $<S^2>^{1/2}$ is appropriately reduced with respect to the absolute molecular weight $M_w$ of the polymer. As a result, the polymer easily moves to the surface layer of the porous membrane when the porous membrane is formed, and the polymer density of the surface layer of the porous membrane is likely to increase. Therefore, it is presumed that the porous membrane exhibits excellent separation performance. On the other hand, when the value of a is 0.32 or more, the radius of gyration $<S^2>^{1/2}$ is appropriately increased with respect to the absolute molecular weight $M_w$ of the polymer. As a result, it is presumed that the polymers are appropriately entangled with each other, the polymer density of the surface layer becomes homogeneous, and higher separation performance is exhibited. Furthermore, since the polymer density of the inner layer decreases as the polymer density of the surface layer of the porous membrane increases, it is presumed that high permeation performance is exhibited at the same time as excellent separation performance. The value of a is more preferably 0.37 to 0.40, and still more preferably 0.37 to 0.39.

The value of b for the polymer determined from the relationship of the above formula 1 needs to be 0.18 to 0.42 in order to further enhance the separation performance by homogenization of the polymer density of the surface layer due to entanglement of the polymers. The value of b is preferably 0.20 to 0.38, and more preferably 0.25 to 0.33.

The polyvinylidene fluoride-based resin refers to a homopolymer of vinylidene fluoride or a copolymer of vinylidene fluoride. Here, the copolymer of vinylidene fluoride refers to a polymer having a vinylidene fluoride residue structure. The polymer having a vinylidene fluoride residue structure is typically a copolymer of a vinylidene fluoride monomer and other fluorine-based monomers. Examples of such a fluorine-based monomer include vinyl fluoride, tetrafluoroethylene, propylene hexafluoride, and ethylene trifluorochloride. In the copolymer of the vinylidene fluoride, ethylene or the like other than the fluorine-based monomer may be copolymerized to the extent that the effect of the present invention is not impaired.

The weight average molecular weight of the polyvinylidene fluoride-based resin is preferably from 50,000 Da to 1,000,000 Da, since the permeation performance of the porous membrane is lowered when the weight average molecular weight is large and the separation performance of the porous membrane is lowered when the weight average molecular weight is small. In a case where the porous membrane is subjected to a water treatment application where the porous membrane is exposed to chemical liquid cleaning, the weight average molecular weight is preferably from 100,000 Da to 900,000 Da, and more preferably from 150,000 Da to 800,000 Da.

The porous membrane according to the embodiment of the present invention needs to include a polymer including a polyvinylidene fluoride-based resin as a main component. The term "including polyvinylidene fluoride-based resin as a main component" means that the proportion of polyvinylidene fluoride-based resin in the polymer constituting the porous membrane is 50 mass % or more. The proportion is preferably 55 mass % or more, and more preferably 60 mass % or more in order to ensure high chemical resistance.

The porous membrane may include a component other than the polymer as long as the effects of the present invention are not impaired. Examples of the component other than the polymer include a surfactant and inorganic particles. The main component of the porous membrane is preferably the polymer including a polyvinylidene fluoride-based resin as a main component. In other words, the component other than the polymer in the porous membrane is preferably less than 50 mass %.

In order to easily adjust the value of a for the polymer in the range of 0.32 to 0.41, the porous membrane according to the embodiment of the present invention requires that the polyvinylidene fluoride-based resin includes a branched polyvinylidene fluoride-based resin. The proportion of the branched polyvinylidene fluoride-based resin in the polyvinylidene fluoride-based resin is preferably 10 mass % to 100 mass %, more preferably 25 mass % to 100 mass %, and still more preferably 75 mass % to 100 mass %. The proportion of the branched polyvinylidene fluoride-based resin in the porous membrane is preferably 15 mass % to 100 mass %, more preferably 18 mass % to 80 mass %, and still more preferably 55 mass % to 80 mass %.

In addition, in order to easily adjust the value of a in the range of 0.32 to 0.41, the weight average molecular weight of the branched polyvinylidene fluoride-based resin is preferably 50,000 Da to 1,000,000 Da, more preferably 100,000 Da to 600,000 Da, and still more preferably 120,000 Da to 300,000 Da.

Here, the "branched polyvinylidene fluoride-based resin" refers to a polyvinylidene fluoride-based resin in which the value of a is 0.41 or less. In order to easily adjust the value of a for the polymer in the range of 0.32 to 0.41, the branched polyvinylidene fluoride-based resin preferably has a melt viscosity of 30 kP or less, more preferably 20 kP or less, and still more preferably 10 kP or less.

In order to easily adjust the values of a and b for the polymer in a predetermined range, the polymer constituting the porous membrane according to the embodiment of the present invention preferably includes a hydrophilic resin. When the polymer constituting the porous membrane according to the embodiment of the present invention includes a hydrophilic resin, dirt is less likely to adhere to the porous membrane.

Here, the term "hydrophilic resin" refers to a resin having a high affinity with water and soluble in water, or a resin having a contact angle to water smaller than that of the polyvinylidene fluoride-based resin. Examples of the hydrophilic resin include polymers of cellulose esters such as cellulose acetate or cellulose acetate propionate, fatty acid vinyl esters, polyvinyl acetate, polyvinylpyrrolidone, ethylene oxide, propylene oxide or acrylic acid esters such as polymethylmethacrylate or methacrylic acid esters, and copolymers of these polymers.

The porous membrane according to the embodiment of the present invention preferably has a three-dimensional network structure in order to further enhance the separation performance by homogenization of the polymer density of the surface layer due to entanglement of the polymers. Here, as shown in FIGS. 2 to 5, the "three-dimensional network structure" refers to a structure in which the polymer constituting the porous membrane according to the embodiment of the present invention spreads three-dimensionally in a network shape. The three-dimensional network structure has pores and voids which are partitioned by the polymer forming the network.

The values of a and b can be determined based on the relationship between the radius of gyration $<S^2>^{1/2}$ and the absolute molecular weight $M_w$ measured by GPC-MALS which is a gel permeation chromatograph (hereinafter referred to as "GPC") equipped with a multi-angle light scattering detector (hereinafter referred to as "MALS") and a differential refractometer (hereinafter referred to as "RI"). The measurement using GPC-MALS is performed by dissolving the polymer constituting the porous membrane in a solvent. To improve the solubility of the polymer, a salt may be added to the solvent. In the case of measuring the polyvinylidene fluoride-based resin using GPC-MALS, for example, N-methyl-2-pyrrolidone (hereinafter referred to as "NMP") to which 0.1 mol/L of lithium chloride is added is preferably used.

The relationship between the radius of gyration $<S^2>^{1/2}$ and the absolute molecular weight $M_w$ measured by GPC-MALS is called a conformation plot, and can determine the values of a and b by approximating as shown in formula 1 below by a method commonly used in polymer research. Such a method is common as described in, for example, "size exclusion chromatography" (Kyoritsu Shuppan Co., Ltd., First Edition, 1992). As for the approximation of the conformation plot, within a measurement range of the detector, collinear approximation is performed by applying the least squares method to a log-log graph of the formula 1.

$$<S^2>^{1/2}=bM_w^a \quad \text{(Formula 1)},$$

The branched polyvinylidene fluoride-based resin used in the embodiment of the present invention is preferably a star-shape branched polyvinylidene fluoride-based resin. By employing a star-shape branched polyvinylidene fluoride-based resin, as compared with the linear polyvinylidene fluoride-based resin, the comb-shape branched polyvinylidene fluoride-based resin, and the randomly branched polyvinylidene fluoride-based resin, it is presumed that the polymer is likely to move to the surface layer of the porous membrane when the porous membrane is formed, the polymer density of the surface layer of the porous membrane increases, and thus the porous membrane exhibits further excellent separation performance.

The shape of the branched polyvinylidene fluoride-based resin can be determined by obtaining the β value by the following formulas 4 and 5. Such a method is common as described in, for example, "size exclusion chromatography" (Kyoritsu Shuppan Co., Ltd., First Edition, 1992). In a case where the β value is 0.25 to 0.75, the resin is treated as a star-shape branched polyvinylidene fluoride-based resin, and in a case where the β value is 1.1 to 1.75, the resin is treated as a comb-shape branched polyvinylidene fluoride-based resin or a randomly branched polyvinylidene fluoride-based resin. In the embodiment of the present invention, the β value is preferably from 0.25 to 0.75, more preferably from 0.35 to 0.70, and most preferably from 0.40 to 0.65. The value of the weight average molecular weight may be used for the calculation of the β value.

$g^\beta$=intrinsic viscosity of branched polyvinylidene fluoride-based resin/intrinsic viscosity of linear polyvinylidene fluoride-based resin (Formula 4)

$g=<S^2$ of the branched polyvinylidene fluoride-based resin$>/<S^2$ of the linear polyvinylidene fluoride-based resin$>$ (Formula 5)

Here, the intrinsic viscosity [η] and the radius of gyration $<S^2>^{1/2}$ are measured by GPC-MALS-VISCO further having a viscosity detector (hereinafter referred to as "VISCO") in addition to the GPC-MALS. The measurement is performed by dissolving the polymer constituting the porous membrane in a solvent. To improve the solubility of the polymer, a salt may be added to the solvent. In the case of measuring the polyvinylidene fluoride-based resin using GPC-MALS, for example, NMP to which 0.1 mol/L of lithium chloride is added is preferably used.

In a case where the value of the weight average molecular weight is used for calculating the β value, first, the relationship between the value of the radius of gyration or the intrinsic viscosity in each elution time and the value of the absolute molecular weight in each elution time, which is obtained by the measurement using GPC-MALS-VISCO, is approximated by using formula 1 and formula 6, and values of a, b, e, and f are determined to create approximate expressions. Then, the weight average molecular weight of the polymer constituting the porous membrane is substituted into the $M_w$ of each of the obtained approximate expressions. The β value can be obtained by substituting the radius of gyration $<S^2>^{1/2}$ and the intrinsic viscosity [η] calculated thereby into formula 4 or formula 5, respectively.

$$<S^2>^{1/2}=bM_w^a \quad \text{(Formula 1)},$$

$$[\eta]=eM_w^f \quad \text{(Formula 6)}$$

A composite membrane according to an embodiment of the present invention includes a porous membrane according to an embodiment of the present invention and another layer, in which the porous membrane according to the embodiment of the present invention is disposed on a surface portion. Here, the "surface portion" of the composite membrane refers to a portion from the surface of the composite membrane to a depth of 20 μm in the thickness direction of the composite membrane. Here, in a case where the composite membrane has a hollow fiber shape, the inner surface and/or the outer surface thereof is the "surface of the composite membrane" mentioned here, and the thickness direction of the composite membrane coincides with the radial direction of the hollow fiber membrane. Since the porous membrane according to the embodiment of the present invention exhibiting excellent separation performance is disposed on the surface portion, components contained in the liquid to be filtered do not easily enter the inside of the composite membrane, and thus the composite membrane can maintain high permeation performance over a long period of time.

The other layer is not particularly limited as long as it is a component capable of forming a layer shape by overlapping with the porous membrane. The other layer is preferably a support. Here, the "support" refers to a structure having a breaking force higher than that of the porous membrane for physically reinforcing the porous membrane. In order to increase the breaking force of the support, the breaking strength (breaking force per unit area) of the support is preferably 3 MPa or more, and more preferably 10 MPa or more. When the composite membrane has a hollow fiber shape, the breaking force of the support is preferably 300 gf or more, and more preferably 800 gf or more. The support preferably has a fibrous structure, a columnar structure, or a spherical structure in order to further enhance the strength of the composite membrane.

The breaking strength or the breaking force of the support can be calculated by repeating a tensile test five times on a sample having a length of 50 mm under the conditions of a tensile speed of 50 mm/min using a tensile tester and taking the average value. In a case where the proportion of the volume of the support to the total volume of the composite membrane is 50% or more, the breaking strength or the breaking force of the support which is the component of the composite membrane can be regarded as the breaking strength or the breaking force of the composite membrane.

The molecular weight cutoff of the porous membrane or composite membrane according to the embodiment of the present invention is preferably 5,000 Da to 80,000 Da, more preferably 8,000 Da to 60,000 Da, and still more preferably 10,000 Da to 40,000 Da. Here, the term "molecular weight cutoff" refers to the minimum molecular weight that can be removed by 90% by the porous membrane, in the molecular weights of the components contained in the liquid to be filtered.

The porous membrane according to the embodiment of the present invention has an average surface pore diameter of preferably 3 nm to 16 nm, more preferably 6 nm to 14 nm, and still more preferably 8 nm to 11 nm in order to increase the polymer density of the surface layer and exhibit excellent separation performance. The average surface pore diameter of the porous membrane can be calculated by observing the surface of the porous membrane with a scanning electron microscope (hereinafter, "SEM").

More specifically, the surface of the porous membrane is observed with SEM at a magnification of 30,000 times to 100,000 times, and the area of each of 300 randomly selected pores is measured. From the area of the pores, the diameter when it is assumed that the pore is a circle is calculated as the pore diameter, and the average value thereof can be used as the surface average pore diameter.

In the porous membrane or composite membrane according to the embodiment of the present invention, the average surface pore diameter is in the above range, and the pure water permeability at 25° C. and 50 kPa is preferably 0.1 m³/m²/hr to 0.8 m³/m²/hr, and more preferably 0.3 m³/m²/hr to 0.7 m³/m²/hr. The pure water permeability at 50 kPa of the porous membrane or the composite membrane according to the embodiment of the present invention may be calculated by measuring the membrane area and the amount of permeated water per unit time at a pressure within a range where the porous membrane is not deformed, and converting these values into values under a pressure of 50 kPa, respectively. In the conversion by pressure, a proportional relationship is established.

It is necessary for a production method of a porous membrane according to an embodiment of the present invention to include:

a polymer solution preparation step (A) of dissolving a polymer in a solvent to obtain a polymer solution, in which the polymer includes a polyvinylidene fluoride-based resin as a main component and the polyvinylidene fluoride-based resin includes a branched polyvinylidene fluoride-based resin; and a porous membrane formation step (B) of coagulating the polymer solution in a non-solvent to form a porous membrane, in which the polymer has a value of a of 0.32 to 0.41 and a value of b of 0.18 to 0.42, each of which is determined by approximation according to the formula 1 below from a radius of gyration $<S^2>^{1/2}$ and an absolute molecular weight $M_w$ of the polymer which are measured by GPC-MALS (gel permeation chromatograph equipped with a multi-angle light scattering detector).

$$<S^2>^{1/2}=bM_w^a \quad \text{(Formula 1)},$$

When the value of a for the polymer including, as a main component, a polyvinylidene fluoride-based resin including a branched polyvinylidene fluoride-based resin, which is dissolved in a solvent in the polymer solution preparation step (A), is 0.41 or less, the radius of gyration $<S^2>^{1/2}$ is appropriately small with respect to the absolute molecular weight $M_w$ of the polymer. As a result, in the porous membrane formation step (B), the polymer is likely to move to the surface layer of the porous membrane when the porous membrane is formed, and the polymer density of the surface layer of the porous membrane is likely to increase. Therefore, it is presumed that the porous membrane exhibits excellent separation performance. On the other hand, when the value of a is 0.32 or more, the polymers are appropriately entangled with each other, and the polymer density of the surface layer is homogeneous. Therefore, it is presumed that higher separation performance is exhibited. Furthermore, since the polymer density of the inner layer decreases as the polymer density of the surface layer of the porous membrane increases, it is presumed that high permeation performance is exhibited at the same time as excellent separation performance.

When the value of b for the polymer is 0.18 to 0.42, it is presumed that the polymer density of the surface layer is further homogenized by the entanglement of the polymers, and the separation performance of the porous membrane is further enhanced.

The solvent used in the polymer solution preparation step (A) is preferably a good solvent. Here, the "good solvent" refers to a solvent capable of dissolving 5 mass % or more of the polyvinylidene fluoride-based resin even in a low temperature region of 60° C. or less. Examples of the good solvent include NMP, dimethylacetamide, dimethylformamide, methylethylketone, acetone, tetrahydrofuran, tetramethylurea, trimethyl phosphate, and a mixed solvent thereof.

The polymer solution obtained in the polymer solution preparation step (A) may appropriately contain a second resin such as a hydrophilic resin, a plasticizer, a salt, or the like, in addition to the polyvinylidene fluoride-based resin.

When the polymer solution contains a plasticizer or a salt, the solubility of the polymer solution is improved. Examples of the plasticizer include glycerol triacetate, diethylene glycol, dibutyl phthalate, and dioctyl phthalate. Examples of the salt include calcium chloride, magnesium chloride, lithium chloride, and barium sulfate.

The concentration of the polymer solution obtained in the polymer solution preparation step (A) is preferably from 15 mass % to 30 mass %, and more preferably from 20 mass % to 25 mass %, in order to achieve both high separation performance and permeation performance.

In the polymer solution obtained in the polymer solution preparation step (A), the proportion of the branched polyvinylidene fluoride-based resin in the porous membrane constituent is preferably 15 mass % to 100 mass %, more preferably 18 mass % to 80 mass %, and still more preferably 55 mass % to 80 mass %.

Whether or not the polymer is completely dissolved in the solvent in the polymer solution preparation step (A) can be determined by visually confirming that there is no turbidity or insoluble matter, and it is preferable to confirm by using an absorptiometer. When the dissolution of the polymer is insufficient, not only the storage stability of the polymer solution is deteriorated, but also the structure of the porous membrane to be produced is inhomogeneous, which makes it difficult to exhibit excellent separation performance. The absorbance of the obtained polymer solution is preferably 0.50 or less, and more preferably 0.09 or less at a wavelength of 500 nm.

The crystallinity of the polyvinylidene fluoride-based resin dissolved in the solvent in the polymer solution preparation step (A) is preferably 35% or more, more preferably 38% or more, and still more preferably 40% or more in order to easily adjust the values of a and b for the polymer constituting the porous membrane to be produced within a predetermined range. The crystallinity of the polyvinylidene fluoride-based resin can be calculated from the measurement result of a differential scanning calorimeter (hereinafter referred to as "DSC").

The branched polyvinylidene fluoride-based resin used in the polymer solution preparation step (A) is preferably a star-shape branched polyvinylidene fluoride-based resin. By employing a star-shape branched polyvinylidene fluoride-based resin, as compared with the linear polyvinylidene fluoride-based resin, the comb-shape branched polyvinylidene fluoride-based resin, and the randomly branched polyvinylidene fluoride-based resin, it is presumed that the polymer is likely to move to the surface layer of the porous membrane when the porous membrane is formed, the polymer density of the surface layer of the porous membrane increases, and thus the porous membrane exhibits further excellent separation performance.

The term "non-solvent" in the porous membrane formation step (B) refers to a solvent that does not dissolve and swell the fluororesin polymer up to the melting point of the polyvinylidene fluoride-based resin or the boiling point of the solvent. Examples of the non-solvent include water, hexane, pentane, benzene, toluene, methanol, ethanol, carbon tetrachloride, o-dichlorobenzene, trichloroethylene, aliphatic hydrocarbons such as ethylene glycol, diethylene glycol, triethylene glycol, propylene glycol, butylene glycol, pentanediol, hexanediol, and low molecular weight polyethylene glycol, aromatic hydrocarbons, aliphatic polyhydric alcohols, aromatic polyhydric alcohols, chlorinated hydrocarbons, and other chlorinated organic liquids or mixed solvents thereof.

In the case where the porous membrane is continuously formed in the porous membrane formation step (B), the solvent of the polymer solution is mixed with the non-solvent in a coagulation bath in which the polymer solution and the non-solvent are brought into contact with each other, and the concentration of the solvent derived from the polymer solution rises. Therefore, it is preferable to replace the non-solvent in the coagulation bath such that the composition of the liquid in the coagulation bath is maintained within a certain range. The lower the concentration of the good solvent in the coagulation bath, the faster the coagulation of the polymer solution, so that the structure of the porous membrane is homogenized and excellent separation performance can be exhibited. In addition, since the polymer solution can coagulates faster, the membrane formation speed can be increased, and the productivity of the porous membrane can be improved. The concentration of the good solvent in the coagulation bath is preferably 20% or less, more preferably 15% or less, and still more preferably 10% or less.

In the formation of a typical porous membrane, the separation performance is improved as the temperature of the non-solvent that coagulates the polymer solution is lowered, but there is a so-called trade-off relationship in which the permeation performance decreases. In the polymer solution for forming the porous membrane according to the embodiment of the present invention, since the values of a and b for the polymer are adjusted within a predetermined range, it is possible to realize excellent permeation performance even when the temperature of the non-solvent is further lowered. The temperature of the liquid containing the polymer solution and/or the non-solvent in the coagulation bath is preferably from 0° C. to 25° C., more preferably from 0° C. to 20° C., and still more preferably from 5° C. to 15° C.

The shape of the porous membrane to be produced can be controlled by the mode of coagulation of the polymer solution in the porous membrane formation step (B). In a case of producing a flat membrane-shaped porous membrane, for example, a film-shaped support made of a nonwoven fabric, a metal oxide, a metal, or the like may be applied with a polymer solution and then immersed in a coagulation bath.

In a case where the hollow fiber-shaped porous membrane is produced, the polymer solution may be discharged from the outer peripheral portion of the double-tube spinneret and the core solution may be discharged from the central portion to the coagulation bath containing the non-solvent at the same time. As the core solution, a good solvent or the like in the polymer solution preparation step (A) is preferably used. The porous membrane may be formed on the surface of the hollow fiber-shaped support made of a polymer, a metal oxide, a metal, or the like. Examples of a method of forming the porous membrane on the surface of the hollow fiber-shaped support made of a polymer include a method of simultaneously discharging a solution serving as a raw material of the hollow fiber-shaped support and a polymer solution using a triple tube spinneret, or a method in which a polymer solution is applied to an outer surface of the hollow fiber-shaped support formed in advance, and the support is made to pass through a non-solvent in the coagulation bath.

EXAMPLES

Hereinafter, the present invention will be specifically described with reference to Examples, but the present invention is not limited thereto.

(i) Values a and b for Polymer Constituting Porous Membrane

The porous membrane or composite membrane immersed in distilled water was frozen at −20° C. using a cryostat (Jung CM3000, manufactured by Leica Co., Ltd.), and a section of the porous membrane (in a case of the composite membrane, section of the porous membrane on the surface portion thereof) was collected and vacuum dried at 25° C. overnight. To the 5 mg of porous membrane after vacuum drying, 5 mL of NMP including 0.1M lithium chloride was added, followed by stirring at 50° C. for about 2 hours. The obtained polymer solution was injected into GPC-MALS (pump: LC-20AD manufactured by Shimadzu Corporation, column oven: SIL-20AXHT manufactured by Shimadzu Corporation, column: two Shodex® KF-806Mφ8.0 mm×30 cm manufactured by Showa Denko K.K. which are connected in series, differential refractive index detector (RI): Optilab rEX manufactured by Wyatt Technology, Inc., Multi-angle light scattering detector (MALS): DAWN HeLEOS manufactured by Wyatt Technology, Inc.) under the following conditions and then measured. The injected polymer solution was eluted from the column in a range of 27 minutes to 43 minutes.

Column temperature: 50° C.
Detector temperature: 23° C.
Solvent: NMP including 0.1M lithium chloride
Flow velocity: 0.5 mL/min
Injection amount: 0.3 mL From the polymer concentration $c_i$ at the elution time $t_i$ obtained from the RI and the excess Rayleigh ratio $R_{\theta i}$ at the elution time $t_i$ obtained from MALS, a plot (Berry plot or Zimm plot; the following formula 3) of $\sin^2(\theta/2)$ and $(K \times c_i / R_{\theta i})^{1/2}$ was performed, and the absolute molecular weight $Mw_i$ at each elution time $t_i$ was calculated from the value of the approximation expression where $\theta$ is approximated to 0. Here, K is an optical constant, and is calculated from the following formula 2. In formula 2, do/dc is the amount of change in the refractive index of the polymer solution with respect to the change in the polymer concentration, that is, the refractive index increment. In a case where a polymer including, as a main component, a polyvinylidene fluoride-based resin is to be measured and the above solvent is used, a value of −0.050 mL/g can be applied as the refractive index increment.

$$K = 4\pi^2 \times n_0^2 \times (dn/dc)^2 / (\lambda^4 \times N_0) \qquad \text{(Formula 2)}$$

$n_0$: Refractive index of solvent
$do/dc$: Refractive index increment
$\lambda$: Wavelength of incident light in vacuum
$N_0$: Avogadro constant The value of the radius of gyration $<S^2>^{1/2}$ at each elution time $t_i$ was calculated from the slope of the following formula 3.

$$(K \times c_i/R_{\theta i})^{1/2} = M w_i^{-1/2}\{1 + \frac{1}{6}(4\pi n_0/\lambda)^2 <S^2> \sin^2(\theta/2)\} \quad \text{(Formula 3)}$$

The absolute molecular weight $M_{wi}$ at each elution time $t_i$ calculated from the formula 3 was plotted on the x axis, the radius of gyration $<S^2>^{1/2}$ at each elution time $t_i$ was plotted on the y axis, and the values of a and b for the polymer constituting the porous membrane were obtained by approximating with the formula 1 in the range of molecular weight of 140,000 Da to 1,000,000 Da so as to be within the measurement range of the detector. As for the approximation, collinear approximation is performed by applying the least squares method to a log-log graph of the formula 1.

$$<S^2>^{1/2} = b M_w^a \quad \text{(Formula 1)},$$

(ii) Shape of Branched Polyvinylidene Fluoride-Based Resin

In (i), the measurement was carried out in the same manner as in (i) except that a viscosity detector: VISCO-STAR® manufactured by Wyatt Technology Co., Ltd. was used as the detector, and the value of the intrinsic viscosity $[\eta_i]$ at each elution time $t_i$ was read. The absolute molecular weight $M_{wi}$ at each elution time $t_i$ obtained in (i) was plotted on the x axis, and the intrinsic viscosity $[\eta_i]$ was plotted on the y axis, and the values of e and f in formula 6 were obtained by approximating with the formula 6 (Mark-Houwink Plot) in the range of molecular weight of 140,000 Da to 1,000,000 Da so as to be within the measurement range of the detector. As for the approximation, collinear approximation is performed by applying the least squares method to a log-log graph of the formula 6.

$$[\eta] = e M_w^f \quad \text{(Formula 6)}$$

The weight average molecular weight of the polymer constituting the porous membrane or the composite membrane was substituted into formula 1 and formula 6, and the obtained radius of gyration $<S^2>^{1/2}$ and intrinsic viscosity $[\eta]$ were substituted into formula 4 and formula 5 to obtain the β value. A case where the β value was 0.25 to 0.75 was determined as a star-shape branched polyvinylidene fluoride-based resin, and a case where the β value was 1.1 to 1.75 was determined as a randomly branched polyvinylidene fluoride-based resin. As a result of measuring Solef® 1015 manufactured by Solvay S.A. as the linear polyvinylidene fluoride-based resin, the radius of gyration $<S^2>^{1/2}$ and the intrinsic viscosity $[\eta]$ were $<S^2>^{1/2} = 0.020\ M_w^{0.58}$, and $[\eta] = 0.065 \times M_w^{0.65}$. The present value can be applied as the value of the linear polyvinylidene fluoride-based resin.

$g^\beta$ = intrinsic viscosity of branched polyvinylidene
fluoride-based resin/intrinsic viscosity of linear polyvinylidene fluoride-based
resin  (Formula 4)

$g = <S^2$ of the branched polyvinylidene fluoride-based
resin$>$/$<S^2$ of the linear polyvinylidene fluoride-based resin$>$  (Formula 5)

(iii) Crystallinity of Polyvinylidene Fluoride-Based Resin

About 5 mg to 10 mg of a polyvinylidene fluoride-based resin was collected, set in a DSC (DSC 6200, manufactured by Hitachi High-Tech Science Corporation), and raised from room temperature to 300° C. at 5° C./min, and an endothermic peak observed in the range of 100° C. to 190° C. was regarded as the heat of fusion of the polyvinylidene fluoride-based resin. The thermal amount was divided by 104.6 J/g, which is the amount of complete crystal fusion heat of the polyvinylidene fluoride-based resin, to calculate the crystallinity of the polyvinylidene fluoride-based resin as a percentage.

(iv) Molecular Weight Cutoff of Porous Membrane or Composite Membrane

In a case where the shape of the porous membrane was a flat membrane shape, evaluation was performed for an effective membrane area of 30 cm². In a case where the shape of the porous membrane was a hollow fiber shape, evaluation was performed for an effective membrane area of 14 cm². Regarding the composite membrane including the support in addition to the porous membrane, the entire composite membrane including the support was evaluated. The following various dextrans were used for the evaluation.

Dextran f1 to f4 (manufactured by Fluka Co., Ltd.; weight average molecular weight: 1,500 Da, 6,000 Da, 15,000 Da to 25,000 Da, 40,000 Da, respectively)

Dextran a1 and a2 (manufactured by Aldrich; weight average molecular weight: 60,000 Da, 20,000 Da, respectively)

Dextran a3 and a4 (molecular weight standard substance manufactured by Aldrich; weight average molecular weight: 5,200 Da, 150,000 Da, respectively)

Dextran a5 to a7 (molecular weight standard substance manufactured by Aldrich; weight average molecular weight: 1,300 Da, 12,000 Da, 50,000 Da, respectively)

Dextran f1 to dextran f4 and dextran a1 and dextran a2 were mixed with distilled water in an amount of 500 ppm, respectively, to prepare a dextran aqueous solution 1. The prepared dextran aqueous solution 1 was supplied to the porous membrane at 10 kPa, subjected to cross flow filtration at a cross flow linear velocity of 1.1 m/s, and the filtrate was sampled. The dextran aqueous solution 1 and the sampled filtrate were injected into GPC (GPC device: HLC-8320 manufactured by Tosoh Co., Ltd., column: one TSK-gel® G3000PW φ 7.5 mm×30 cm manufactured by Tosoh Co., Ltd. and one TSKgel® α-M φ 7.8 mm×30 cm manufactured by Tosoh Co., Ltd. which are connected in series, RI: HLC®-8320 manufactured by Tosoh Co., Ltd.) for measurement. The injected dextran was eluted from the column in a range of 26 minutes to 42 minutes.

Column temperature: 40° C.
Detector temperature: 40° C.
Solvent: 50 volume % methanol aqueous solution including 0.5M lithium nitrate
Flow velocity: 0.5 mL/min
Injection amount: 0.1 mL In each elution time $t_1$, the removal rate was calculated from the values of the differential refractive index between the filtrate and the dextran aqueous solution 1. Further, dextran a3 and dextran a4 were mixed with distilled water in an amount of 500 ppm, respectively, to prepare a dextran aqueous solution 2. Further, dextran a5 to dextran a7 were mixed with distilled water in an amount of 500 ppm, respectively, to prepare a dextran aqueous solution 3. The dextran aqueous solutions 2 and 3 were injected into GPC under the same conditions as the dextran aqueous solution 1 for measurement, and a calibration curve was prepared for calculating the molecular weight at each elution time $t_1$. From the prepared calibration curve, the removal rate at each elution time $t_1$ was converted into the removal rate in each molecular weight, and the minimum molecular weight at which the removal rate was 90% was defined as the molecular weight cutoff of the porous membrane to be evaluated.

(v) Average Surface Pore Diameter of Porous Membrane

The surface of the porous membrane was observed by SEM (S-5500, manufactured by Hitachi High-Tech Corporation) at a magnification of 30,000 times to 100,000 times, and the area of each of 300 randomly selected pores was measured. From the area of the pores, the diameter when the pore was assumed to be a circle was calculated as the pore diameter, and the average value thereof was defined as the surface average pore diameter.

(vi) Pure Water Permeability of Porous Membrane or Composite Membrane

In a case where the porous membrane had a flat membrane shape, evaluation was performed for an effective membrane area of 30 cm$^2$. In a case where the porous membrane had a hollow fiber shape, evaluation was performed for an effective membrane area of 14 cm$^2$. Under the conditions of a temperature of 25° C. and a filtration differential pressure of 10 kPa, distilled water was fed to the porous membrane for 1 hour and the total amount thereof was filtered. The obtained amount of permeated water (m$^3$) was measured, converted into a value per unit time (h) and unit membrane area (m$^2$), and further converted by a pressure (50 kPa) to calculate the pure water permeability. Regarding the composite membrane including the support in addition to the porous membrane, the entire composite membrane including the support was evaluated.

(vii) Absorbance of Polymer Solution

The polymer solution was placed in a polystyrene cell having an optical path length of 10 mm and set in an absorptiometer (UV-2450, manufactured by Shimadzu Corporation) to measure an absorbance at a wavelength of 500 nm.

(viii) Raw Material of Polymer Solution

The raw materials of the polymer solutions used in Examples and Comparative Examples are summarized below.

Branched polyvinylidene fluoride (hereinafter, referred to as "branched PVDF") 1 (Solef®, the same applies hereinafter) 9009, manufactured by Solvay S.A.; weight average molecular weight of 180,000 Da; crystallinity of 44%; melt viscosity of 3 kP; a=0.33 and b=0.42 in the formula 1; star-shape branched polyvinylidene fluoride-based resin (($\beta$=0.42))

Branched PVDF2 (Solef 460, manufactured by Solvay S.A.; weight average molecular weight of 730,000 Da; crystallinity of 38%; melt viscosity of 26 kP; a=0.31 and b=0.47 in the formula 1; randomly branched polyvinylidene fluoride-based resin ($\beta$=1.33))

Branched PVDF3 (Solef 9007, manufactured by Solvay S.A.; weight average molecular weight of 150,000 Da; crystallinity of 45%; melt viscosity of 2 kP; a=0.33 and b=0.42 in the formula 1; star-shape branched polyvinylidene fluoride-based resin ($\beta$=0.43)) Linear polyvinylidene fluoride (hereinafter, "linear PVDF") 1 (Kynar® 710, manufactured by Arkema Co., Ltd.; weight average molecular weight of 180,000 Da; crystallinity of 49%; melt viscosity of 6 kP; a=0.42 and b=0.16 in the formula 1)

Linear PVDF2 (Solef 1015, manufactured by Solvay S.A.; weight average molecular weight of 330,000 Da; crystallinity of 48%; melt viscosity of 22 kP; a=0.65 and b=0.065 in the formula 1)

Linear PVDF3 (KF1300, manufactured by Kureha Corporation; weight average molecular weight of 350,000 Da)

NMP (manufactured by Mitsubishi Chemical Corporation)

Cellulose acetate (hereinafter referred to as "CA") (LT-35, manufactured by Daicel Corporation)

Cellulose acetate propionate (hereinafter, "CAP") (CAP 482-0.5, manufactured by Eastman Chemical Company)

Polyvinylpyrrolidone (hereinafter, "PVP") (K17, manufactured by BASF SE)

Example 1

25 mass % of branched PVDF1 and 75 mass % of linear PVDF1 were mixed to obtain "PVDF", and NMP or the like was added thereto. The mixture was stirred at 120° C. for 4 hours to prepare a polymer solution having a composition ratio shown in Table 1. The absorbance of the polymer solution cooled to 25° C. was 0.1.

Next, a polyester fiber nonwoven fabric having a density of 0.42 g/cm$^3$ was used as a support, and the prepared polymer solution was uniformly applied to the surface at 10 m/min using a bar coater (membrane thickness: 2 mil). After 3 seconds from the coating, the support coated with the polymer solution was immersed in distilled water at 6° C. for 60 seconds to be coagulated, thereby forming a porous membrane having a three-dimensional network structure.

The results of evaluating the obtained porous membrane are shown in Table 1 and FIG. 1. The value of a in the formula 1 was 0.40, the value of b in the formula 1 was 0.19, and each of the molecular weight cutoff, which is an index of the separation performance, and the pure water permeability, which is an index of the permeation performance, showed an excellent value.

Example 2

25 mass % of branched PVDF2 and 75 mass % of linear PVDF1 were mixed to obtain "PVDF", and NMP or the like was added thereto. The mixture was stirred at 120° C. for 4 hours, and thus a polymer solution having a composition ratio shown in Table 1 was prepared and allowed to cool to 25° C. The absorbance of the polymer solution was 0.3.

Next, a porous membrane having a three-dimensional network structure was formed in the same manner as in Example 1, except that the temperature of distilled water was changed to 15° C.

The results of evaluating the obtained porous membrane are shown in Table 1 and FIG. 1. The value of a in the formula 1 was 0.40, the value of b in the formula 1 was 0.18, and each of the molecular weight cutoff and the pure water permeability showed an excellent value.

Example 3

25 mass % of branched PVDF3 and 75 mass % of linear PVDF1 were mixed to obtain "PVDF", and NMP or the like was added thereto. The mixture was stirred at 120° C. for 4 hours, and thus a polymer solution having a composition ratio shown in Table 1 was prepared and allowed to cool to 25° C. The absorbance of the polymer solution was 0.04.

Next, a porous membrane having a three-dimensional network structure was formed in the same manner as in Example 1, except that the temperature of distilled water was changed to 30° C.

The results of evaluating the obtained porous membrane are shown in Table 1 and FIG. 1. The value of a in the formula 1 was 0.41, the value of b in the formula 1 was 0.18, and each of the molecular weight cutoff and the pure water permeability showed an excellent value.

Example 4

25 mass % of branched PVDF2 and 75 mass % of linear PVDF2 were mixed to obtain "PVDF", and NMP or the like was added thereto. The mixture was stirred at 120° C. for 4 hours, and thus a polymer solution having a composition ratio shown in Table 1 was prepared and allowed to cool to 25° C. The absorbance of the polymer solution was 0.4.

Next, a porous membrane having a three-dimensional network structure was formed in the same manner as in Example 1, except that the temperature of distilled water was changed to 15° C.

The results of evaluating the obtained porous membrane are shown in Table 1 and FIG. 1. The value of a in the formula 1 was 0.41, the value of b in the formula 1 was 0.18, and each of the molecular weight cutoff and the pure water permeability showed an excellent value.

Example 5

The branched PVDF2 was used as "PVDF", and NMP or the like was added thereto. The mixture was stirred at 120° C. for 4 hours to prepare a polymer solution having a composition ratio shown in Table 2. The absorbance of the polymer solution cooled to 25° C. was 0.7.

Next, a porous membrane having a three-dimensional network structure was formed in the same manner as in Example 1, except that the temperature of distilled water was changed to 30° C.

The results of evaluating the obtained porous membrane are shown in Table 2 and FIG. 1. The value of a in the formula 1 was 0.36, and the value of b in the formula 1 was 0.27. The value of β in the formula 4 was 1.21, and the polymer contained in the porous membrane was determined to be a randomly branched polyvinylidene fluoride-based resin. Each of the molecular weight cutoff and the pure water permeability showed an excellent value.

Example 6

A polymer solution having a composition ratio shown in Table 2 was prepared in the same manner as in Example 5, except that branched PVDF1 was used instead of the branched PVDF2. The absorbance of the polymer solution cooled to 25° C. was 0.09.

Next, a porous membrane having a three-dimensional network structure was formed in the same manner as in Example 1, except that the temperature of distilled water was changed to 15° C.

The results of evaluating the obtained porous membrane are shown in Table 2 and FIG. 1. The value of a in the formula 1 was 0.37, and the value of b in the formula 1 was 0.28. The value of β in the formula 4 was 0.63, and the polymer contained in the porous membrane was determined to be a star-shape branched polyvinylidene fluoride-based resin. Each of the molecular weight cutoff and the pure water permeability showed an excellent value.

Example 7

A polymer solution having a composition ratio shown in Table 2 was prepared in the same manner as in Example 5, except that branched PVDF 3 was used instead of the branched PVDF2, and CAP was used instead of CA. The absorbance of the polymer solution cooled to 25° C. was 0.07.

Next, a porous membrane having a three-dimensional network structure was formed in the same manner as in Example 1, except that the temperature of distilled water was changed to 20° C.

The results of evaluating the obtained porous membrane are shown in Table 2 and FIG. 1. The value of a in the formula 1 was 0.37, the value of b in the formula 1 was 0.28, and each of the molecular weight cutoff and the pure water permeability showed an excellent value.

Example 8

38 mass % of a linear PVDF3 and 62 mass % of γ-butyrolactone were mixed and dissolved at 160° C. to prepare a membrane forming solution. This membrane forming solution was discharged from a double-tube spinneret while being accompanied by an 85 mass % γ-butyrolactone aqueous solution as a hollow portion forming solution. The discharged membrane forming solution was coagulated in a cooling bath containing an 85 mass % γ-butyrolactone aqueous solution having a temperature of 20° C. placed 30 mm below from the spinneret to prepare a hollow fiber-shaped support having a spherical structure.

A polymer solution was prepared in the same manner as in Example 5, except that branched PVDF3 was used instead of the branched PVDF 2. The absorbance of the polymer solution cooled to 25° C. was 0.07.

Next, a polymer solution was uniformly applied to the outer surface of the hollow fiber-shaped support at 10 m/min (thickness: 50 μm). After 1 second from the coating, the support coated with the polymer solution was immersed in distilled water at 15° C. for 10 seconds to be coagulated, thereby forming a porous membrane having a three-dimensional network structure.

Figure 2:
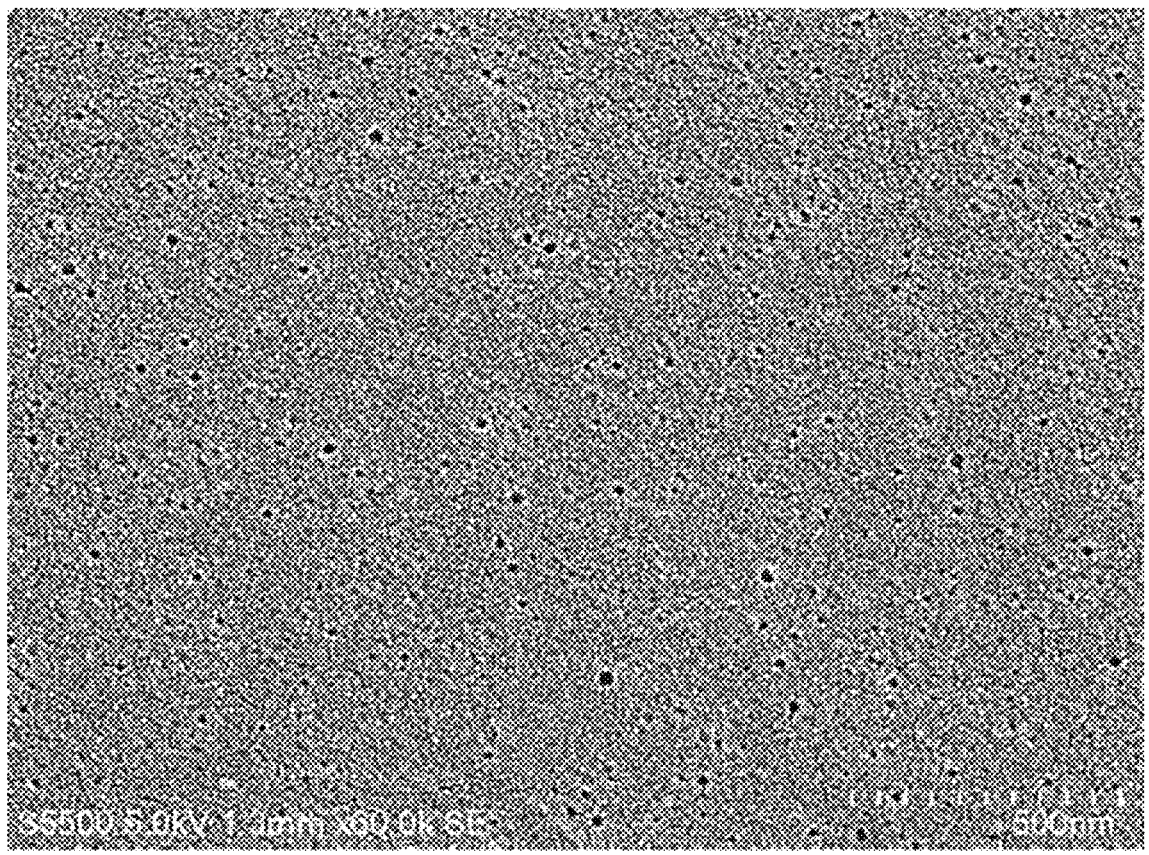
FIG. 2 is a surface enlarged image of a porous membrane obtained in Example 8 exemplifying the "three-dimensional network structure".
Figure 3:
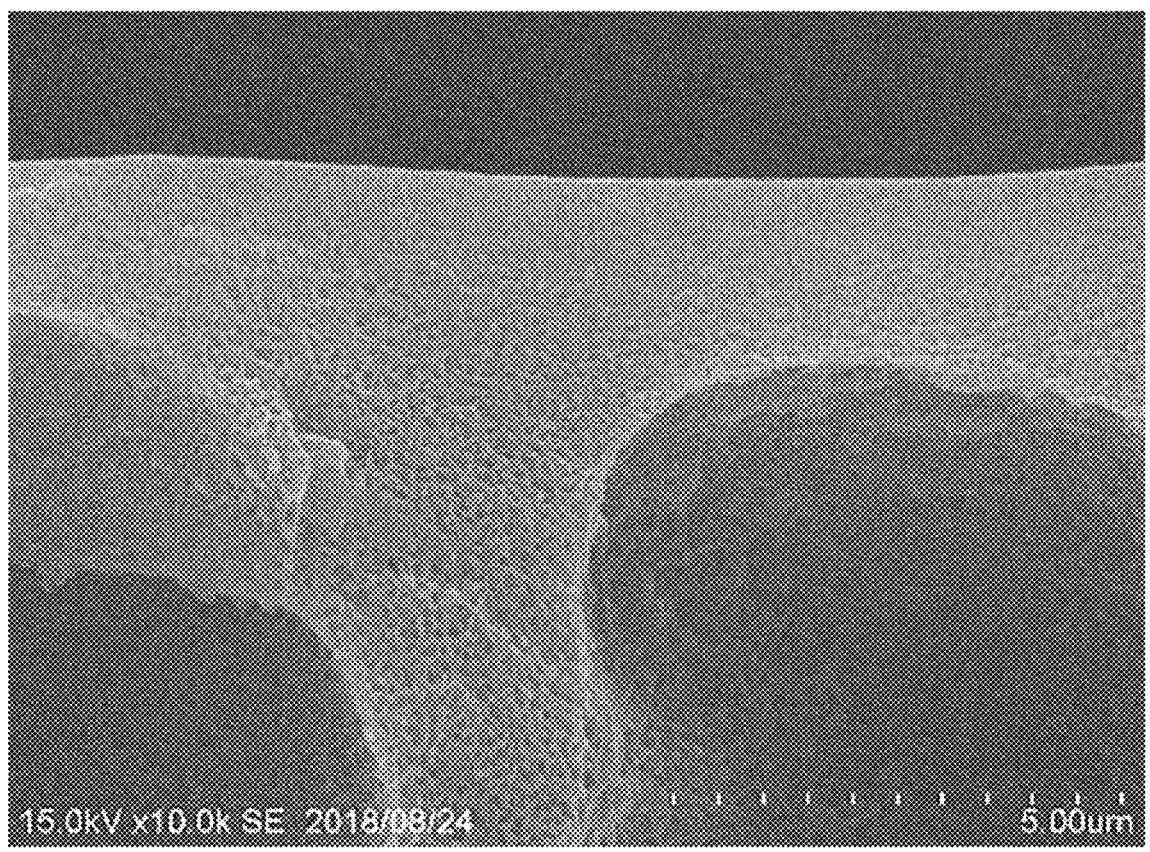
FIG. 3 is an enlarged cross-sectional image of the porous membrane obtained in Example 8 exemplifying the "three-dimensional network structure".

The results of evaluating the obtained porous membrane are shown in Table 2 and FIG. 1. Enlarged images obtained by observing the obtained porous membrane with SEM are shown in FIGS. 2 and 3. FIG. 2 is a surface image (60,000 times) of the obtained porous membrane, and FIG. 3 is a cross-sectional image (10,000 times) of the obtained porous membrane. The value of a in the formula 1 was 0.37, the value of b in the formula 1 was 0.28, and each of the molecular weight cutoff and the pure water permeability showed an excellent value.

Comparative Example 1

Linear PVDF2 was used as "PVDF", and NMP was added thereto. The mixture was stirred at 120° C. for 4 hours to prepare a polymer solution having a composition ratio shown in Table 3. The absorbance of the polymer solution cooled to 25° C. was 0.01.

Next, a porous membrane having a three-dimensional network structure was formed in the same manner as in Example 1, except that the temperature of distilled water was changed to 25° C.

The results of evaluating the obtained porous membrane are shown in Table 3 and FIG. 1. The value of a in the formula 1 was 0.42, and the value of b in the formula 1 was 0.16. Both the molecular weight cutoff and the pure water permeability were inferior to the results of Examples.

Comparative Example 2

A polymer solution having a composition ratio shown in Table 3 was prepared in the same manner as in Comparative Example 1, except that branched PVDF2 was used instead of the linear PVDF2. The absorbance of the polymer solution cooled to 25° C. was 0.1.

Next, a porous membrane having a three-dimensional network structure was formed in the same manner as in Example 1, except that the temperature of distilled water was changed to 40° C.

The results of evaluating the obtained porous membrane are shown in Table 3 and FIG. 1. The value of a in the formula 1 was 0.31, and the value of b in the formula 1 was 0.47. The value of β in the formula 4 was 1.33, and the polymer contained in the porous membrane was determined to be a randomly branched polyvinylidene fluoride-based resin. Both the molecular weight cutoff and the pure water permeability were inferior to the results of Examples.

Comparative Example 3

A polymer solution having a composition ratio shown in Table 3 was prepared in the same manner as in Example 8, except that linear PVDF1 was used instead of the branched PVDF3. The absorbance of the polymer solution cooled to 25° C. was 0.03.

Next, in the same manner as in Example 8, a polymer solution was applied on the outer surface of the hollow fiber-shaped support and then coagulated, thereby forming a porous membrane having a three-dimensional network structure.

Figure 4:
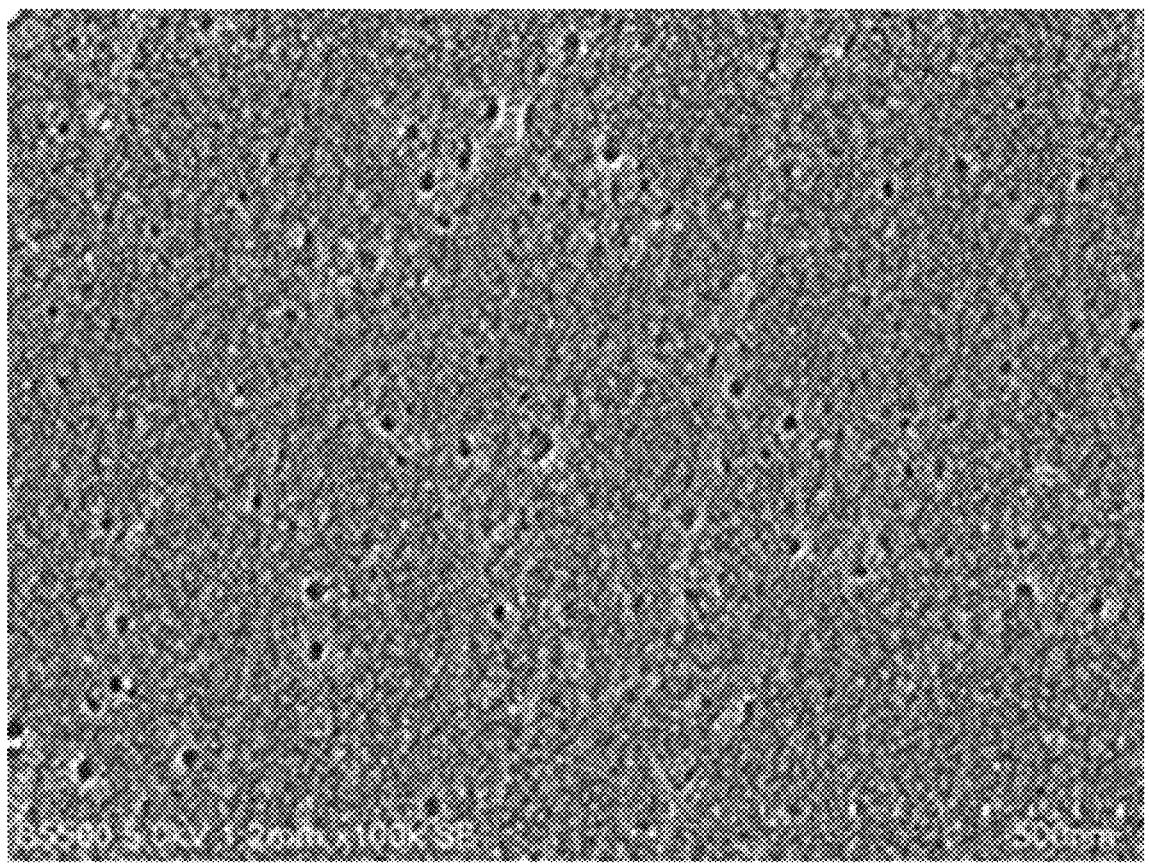
FIG. 4 is a surface enlarged image of a porous membrane obtained in Comparative Example 3 exemplifying the "three-dimensional network structure".
Figure 5:
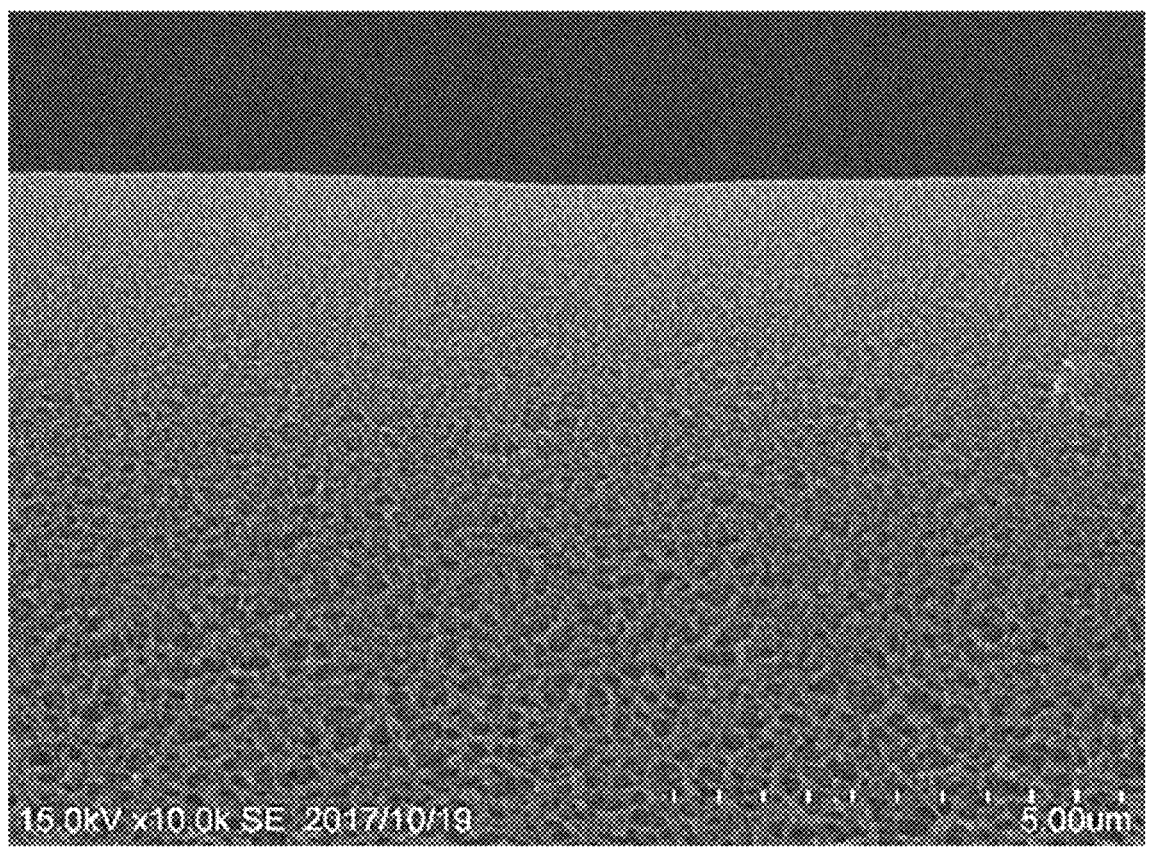
FIG. 5 is an enlarged cross-sectional image of the porous membrane obtained in Comparative Example 3 exemplifying the "three-dimensional network structure".

The results of evaluating the obtained porous membrane are shown in Table 3 and FIG. 1. Enlarged images obtained by observing the obtained porous membrane with SEM are shown in FIGS. 4 and 5. FIG. 4 is a surface image (100,000 times) of the obtained porous membrane, and FIG. 5 is a cross-sectional image (10,000 times) of the obtained porous membrane. The value of a in the formula 1 was 0.43, and the value of b in the formula 1 was 0.17. Both the molecular weight cutoff and the pure water permeability were inferior to the results of Examples.

TABLE 1

|  | Unit | Example 1 | Example 2 | Example 3 | Example 4 |
| --- | --- | --- | --- | --- | --- |
| Composition Ratio of Polymer Solution | — | PVDF/CA/NMP = 12/2.5/85.5 | PVDF/CA/NMP = 12/5/83 | PVDF/CAP/NMP = 12/7/81 | PVDF/CA/NMP = 12/7/81 |
| Composition Ratio of PVDF | Mass % | Branched PVDF1/Linear PVDF1 = 25/75 | Branched PVDF2/Linear PVDF1 = 25/75 | Branched PVDF3/Linear PVDF1 = 25/75 | Branched PVDF2/Linear PVDF2 = 25/75 |
| Temperature of Non-solvent | ° C. | 6 | 15 | 30 | 15 |
| Value a in Formula 1 | — | 0.40 | 0.40 | 0.41 | 0.41 |
| Value b in Formula 1 | — | 0.19 | 0.18 | 0.18 | 0.18 |
| Absorbance of Polymer Solution | — | 0.1 | 0.3 | 0.04 | 0.4 |
| Average Pore Diameter | nm | 13 | 12 | 16 | 10 |
| Molecular Weight Cutoff | Da | 78000 | 65000 | 130000 | 33000 |
| Pure Water Permeability | m$^3$/m$^2$/hr | 0.59 | 0.54 | 0.60 | 0.28 |

TABLE 2

|  | Unit | Example 5 | Example 6 | Example 7 | Example 8 |
| --- | --- | --- | --- | --- | --- |
| Composition Ratio of Polymer Solution | — | PVDF/CA/NMP = 12/7/81 | PVDF/CA/NMP = 12/7/81 | PVDF/CAP/NMP = 12/7/81 | PVDF/CA/NMP = 12/7/81 |
| Composition Ratio of PVDF | Mass % | Branched PVDF2 = 100 | Branched PVDF1 = 100 | Branched PVDF3 = 100 | Branched PVDF3 = 100 |
| Temperature of Non-solvent | ° C. | 30 | 15 | 20 | 15 |
| Value a in Formula 1 | — | 0.36 | 0.37 | 0.37 | 0.37 |
| Value b in Formula 1 | — | 0.27 | 0.28 | 0.28 | 0.28 |
| Absorbance of Polymer Solution | — | 0.7 | 0.09 | 0.07 | 0.07 |
| Average Pore Diameter | nm | 15 | 9 | 11 | 10 |
| Molecular Weight Cutoff | Da | 120000 | 32000 | 55000 | 31000 |
| Pure Water Permeability | m$^3$/m$^2$/hr | 0.65 | 0.41 | 0.49 | 0.37 |

TABLE 3

|  | Unit | Comparative Example 1 | Comparative Example 2 | Comparative Example 3 |
| --- | --- | --- | --- | --- |
| Composition Ratio of Polymer Solution | — | PVDF/NMP = 20/80 | PVDF/NMP = 20/80 | PVDF/CA/NMP = 12/7/81 |
| Composition Ratio of PVDF | Mass % | Linear PVDF2 = 100 | Branched PVDF2 = 100 | Linear PVDF1 = 100 |
| Temperature of Non-solvent | ° C. | 25 | 40 | 15 |
| Value a in Formula 1 | — | 0.42 | 0.31 | 0.43 |
| Value b in Formula 1 | — | 0.16 | 0.47 | 0.17 |
| Absorbance of Polymer Solution | — | 0.01 | 0.1 | 0.03 |
| Average Pore Diameter | nm | 10 | 18 | 20 |
| Molecular Weight Cutoff | Da | 37000 | 170000 | 200000 |
| Pure Water Permeability | m$^3$/m$^2$/hr | 0.05 | 0.40 | 0.21 |

Although the present invention has been described in detail with reference to specific embodiments, it will be apparent to those skilled in the art that various changes and modifications can be made without departing from the spirit and scope of the present invention.

The invention claimed is:

1. A porous membrane comprising a polymer comprising a polyvinylidene fluoride-based resin as a main component, and a branched polyvinylidene fluoride-based resin as the polyvinylidene fluoride-based resin, wherein:
   a proportion of the polyvinylidene fluoride-based resin in the polymer is 55 mass % or more,
   a proportion of the branched polyvinylidene fluoride-based resin in the polyvinylidene fluoride-based resin is 10 mass % to 100 mass %,
   the branched polyvinylidene fluoride-based resin has a weight average molecular weight of 50,000 Da to 1,000,000 Da,
   wherein the polymer has a value of "a" of 0.32 to 0.41 and a value of "b" of 0.18 to 0.42, where "a" represents a value specific to the polymer for determining a radius gyration and "b" represents a proportionality constant specific to the polymer for determining a radius gyration, each of which is determined by approximation according to the formula 1 below from a radius of gyration $<S^2>^{1/2}$ and an absolute molecular weight $M_w$ of the polymer which are measured by GPC-MALS (gel permeation chromatograph equipped with a multi-angle light scattering detector):

$$<S^2>^{1/2} = bM_w^a \quad \text{(Formula 1)},$$

the porous membrane has an average surface pore diameter of 3 nm to 16 nm, and a pure water permeability at 25° C. and 50 kPa of 0.1 m$^3$/m$^2$/hr to 0.8 m$^3$/m$^2$/h, and
   the branched polyvinylidene fluoride-based resin is a star-shape branched polyvinylidene fluoride-based resin.

2. The porous membrane according to claim 1, wherein the polymer includes a hydrophilic resin.

3. The porous membrane according to claim 1, having a three-dimensional network structure.

4. The porous membrane according to claim 1, wherein an amount of the branched polyvinylidene fluoride-based resin is 15 mass % to 100 mass %.

5. A composite membrane comprising the porous membrane according to claim 1 and another layer, wherein the porous membrane is disposed on a surface portion thereof.

6. The composite membrane according to claim 5, wherein the other layer is a support.

7. A method for preparing the porous membrane according to claim 1, the method comprising:
   a polymer solution preparation step (A) of dissolving the polymer in a solvent to obtain a polymer solution; and
   a porous membrane formation step (B) of coagulating the polymer solution in a non-solvent to form the porous membrane,
   wherein the polyvinylidene fluoride-based resin subjected to the polymer solution preparation step (A) has a crystallinity of 35% or more.

* * * * *